United States Statutory Invention Registration [19]

[11] Reg. Number: H597

Heath et al.

[43] Published: Mar. 7, 1989

[54] METHOD OF ETCHING ZIRCONIUM DIBORIDE

[75] Inventors: Linda S. Heath, W. Long Branch; Bonnie L. Kwiatkowski, Bayville, both of N.J.

[73] Assignee: The United States of America as represented by the Secretary of the Army, Washington, D.C.

[21] Appl. No.: 176,126

[22] Filed: Mar. 31, 1988

[51] Int. Cl.[4] ..... B44C 1/22

[52] U.S. Cl. ..... 156/643

[58] Field of Search ..... 156/643, 646, 664, 656, 156/659.1, 904

[56] References Cited

U.S. PATENT DOCUMENTS

| | | | |
|---|---|---|---|
| 3,855,024 | 12/1974 | Lim | 156/646 |
| 4,350,729 | 9/1982 | Nakano et al. | 156/667 |
| 4,372,806 | 2/1983 | Vossen, Jr. | 156/646 |
| 4,425,769 | 1/1984 | Hakoune | 156/643 |
| 4,448,800 | 5/1984 | Ehara et al. | 156/647 |
| 4,545,114 | 10/1985 | Ito et al. | 156/647 |
| 4,612,554 | 9/1986 | Poleshuk | 156/657 |
| 4,639,748 | 1/1987 | Drake et al. | 156/647 |
| 4,702,792 | 10/1987 | Chow et al. | 156/645 |
| 4,711,698 | 12/1987 | Douglas | 156/655 |
| 4,738,747 | 4/1988 | Panson | 156/664 |

*Primary Examiner*—John F. Terapane
*Assistant Examiner*—Eric Jorgensen
*Attorney, Agent, or Firm*—Sheldon Kanars; Roy E. Gordon

[57] ABSTRACT

A thin film of zirconium diboride that has been deposited onto a substrate and patterned using photolithography is dry etched in a commercial plasma etcher with either chloride gas, or a mixture of a chloride gas with oxygen, or a mixture of a chloride gas with nitrogen, or a mixture of chloride gas with a noble gas, or a fluoride gas, or a mixture of a fluoride gas with oxygen, or a mixture of a fluoride gas with nitrogen, or a mixture of a fluoride gas with a noble gas.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF ETCHING ZIRCONIUM DIBORIDE

The invention described herein may be manufactured, used, and licensed by or for the Government for governmental purposes without the payment to us of any royalty thereon.

This invention relates in general to a method of etching zirconium diboride, $ZrB_2$ and in particular to a method of dry etching a thin film of $ZrB_2$ that has been deposited onto a substrate and patterned using photolithography.

BACKGROUND OF THE INVENTION

U.S. patent application Ser. No. 156,124, filed 16 Feb., 1988, of Linda S. Heath for "Method of Etching Titanium Diboride" and assigned to a common assignee and with which this application is copending describes and claims a method of etching titanium diboride with a dry etch.

Zirconium diboride, like titanium diboride, $TiB_2$, has become of interest in laboratory research because of its resistance to change or degradation at high temperatures. However, zirconium diboride does exhibit other properties that differ significantly from the properties of titanium diboride. That is, $ZrB_2$ is twice as electrically conductive as $TiB_2$. Moreover, the melting point of $ZrB_2$ is 3245° C. as compared to 2980° C., the melting point of $TiB_2$. The higher melting point makes $ZrB_2$ more resistant to changes with heat. Then too, $ZrB_2$ is less porous than $TiB_2$.

One of the difficulties involved with working with $ZrB_2$ is that because of its resistance to attack, it is difficult to pattern. In fact, no wet etches have been available to carry out such patterning.

SUMMARY OF THE INVENTION

The general object of this invention is to provide a method of etching $ZrB_2$. A more particular object of this invention is to provide a method of etching a thin film of $ZrB_2$ that has been deposited onto a substrate and patterned using photolithography.

It has now been found that the aforementioned objects can be attained by etching $ZrB_2$ with a dry etch.

More particularly, according to the invention, a thin film of $ZrB_2$ that has been deposited onto a substrate and patterned using photolithography is dry etched by first mounting the substrate bearing the patterned thin film on the lower electrode of a pair of electrodes in the etch chamber of a commercial plasma etcher or plasma therm etcher. The etch chamber is evacuated to a pressure of about $10^{-6}$ Torr and a dry etchant as for example, tetrafluoromethane ($CF_4$) or dichlorodifluoromethane ($CCl_2F_2$) admitted at a flow rate of about 1 to 100 sccm and a pressure set at about 1 to 500 mTorr. An electric field is applied between the electrodes, the power level set at about 50 to 1000 watts and etching allowed to proceed for the desired time.

Other dry etchants that will etch $ZrB_2$ include a chloride gas or a mixture of chloride gas with oxygen or a mixture of a chloride gas with nitrogen or a mixture of chloride gas with a noble gas or a fluoride gas or a mixture of a fluoride gas with nitrogen or a mixture of a fluoride gas with a noble gas.

After the dry etch, the sample is removed and the etch rate determined by measuring the etch depth and dividing by the etch time.

By adjusting the process parameters, one is able to attain etch rates of 67 to 140 Å/min for $ZrB_2$. This is useful for patterning $ZrB_2$ as a diffusion barrier or a Schottky contact to semiconductors.

DESCRIPTION OF THE PREFERRED EMBODIMENT

A thin film of $ZrB_2$ is first deposited on a gallium arsenide substrate by sputtering and the substrate with thin film of $ZrB_2$ then patterned using photolithography.

The substrate bearing the patterned film is then mounted on the lower electrode of a pair of electrodes in the etch chamber of a commercial plasma etcher. The etch chamber with the electrodes inside is then evacuated to a pressure of about $10^{-6}$ Torr. $CCl_2F_2$ is then admitted into the etch chamber at a flow rate of about 2 to 10 sccm and the pressure set at about 10 to 50 mTorr. An electric field is applied between the electrodes and the power level set at about 300 watts. The etch is allowed to proceed until the $ZrB_2$ is completely removed in the areas exposed by the photolithography.

Other dry etch processes that can be used to etch $ZrB_2$ include reactive ion beam etching (RIBE), chemically assisted ion beam etching (CAIBE), reactive ion etching (RIE), and magnetron ion etching (MIE).

We wish it to be understood that we do not desire to be limited to the exact details as described for obvious modifications will occur to a person skilled in the art.

What is claimed is:

1. Method of etching a thin film of zirconium diboride that has been deposited onto a substrate and patterned using photolithography, said method including the steps of:

(A) mounting a substrate bearing a patterned thin film on a lower electrode of a pair of electrodes in an etch chamber of a plasma therm etcher, (B) evacuating the etch chamber to a pressure of about $10^{-6}$ Torr, (C) admitting a dry etchant to the etch chamber at a flow rate of about 1 to 100 sccm and a pressure set at about 1 to 500 mTorr, (D) applying an electric field between the pair of electrodes and setting the power level at about 50 to 1000 watts, and (E) allowing the etch to proceed for a predetermined time.

2. Method according to claim 1 wherein the dry etchant is selected from the group consisting of a chloride gas, a mixture of a chloride gas with oxygen, a mixture of a chloride gas with nitrogen, a mixture of a chloride gas with a noble gas, a fluoride gas, a mixture of a fluoride gas with oxygen, a mixture of a fluoride gas with nitrogen, and a mixture of a fluoride gas with a noble gas.

3. Method according to claim 2 wherein the dry etchant is a chloride gas.

4. Method according to claim 3 wherein the dry etchant is dichlorodifluoromethane.

5. Method according to claim 2 wherein the dry etchant is a mixture of a chloride gas with oxygen.

6. Method according to claim 2 wherein the dry etchant is a mixture of a chloride gas with nitrogen.

7. Method according to claim 2 wherein the dry etchant is a mixture of a chloride gas with a noble gas.

8. Method according to claim 2 wherein the dry etchant is a fluoride gas.

9. Method according to claim 2 wherein the dry etchant is a mixture of a fluoride gas with oxygen.

10. Method according to claim 2 therein the dry etchant is a mixture of a fluoride gas with nitrogen.

11. Method according to claim 2 wherein the dry etchant is a mixture of a fluoride gas with noble gas.

* * * * *